(No Model.)
E. A. WILDT.
ELECTRIC BELL.
No. 358,910. Patented Mar. 8, 1887.
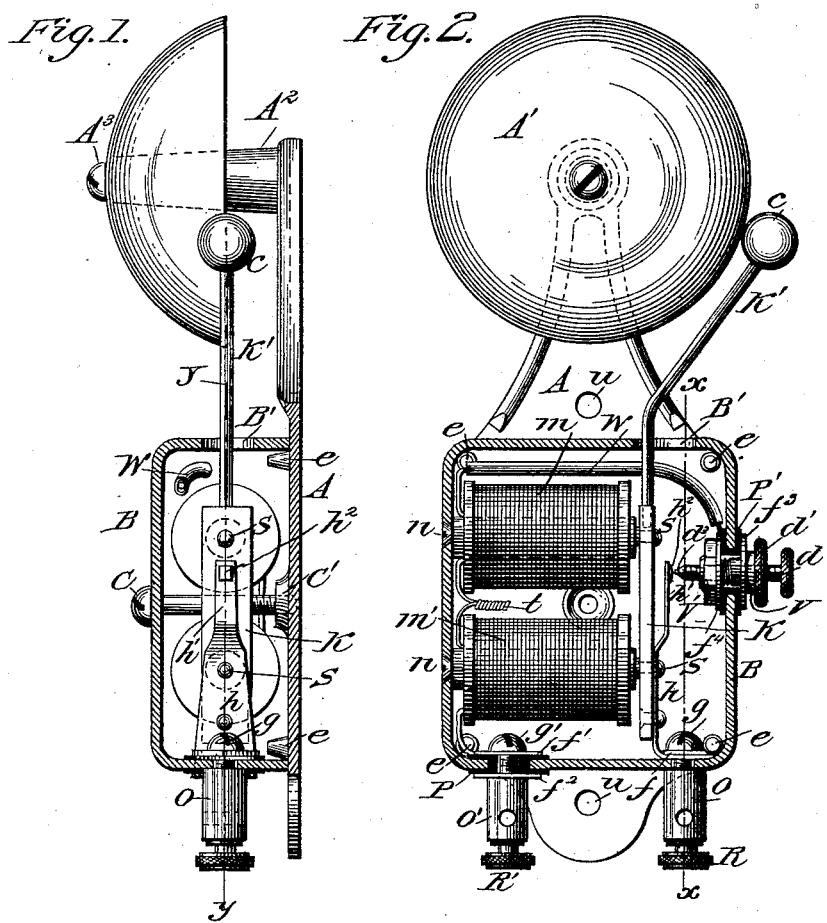
Witnesses.
A. E. Trask
Robert E. Parks
Inventor.
Edward A. Wildt.

UNITED STATES PATENT OFFICE.

EDWARD A. WILDT, OF LONG ISLAND CITY, NEW YORK.

ELECTRIC BELL.

SPECIFICATION forming part of Letters Patent No. 358,910, dated March 8, 1887.

Application filed July 6, 1886. Serial No. 207,287. (No model.)

*To all whom it may concern:*

Be it known that I, EDWARD A. WILDT, a citizen of the United States, residing at Long Island City, in the county of Queens and State of New York, have invented certain new and useful Improvements in Electric Bells, of which the following is a specification.

My invention relates to that class of electric bells that have the operating parts secured to a plate, projections being provided for that purpose and inclosed by a box or cover to protect them from the atmosphere, dust, and insects.

The objects of my invention are to arrange, distribute, and proportion the operating parts in such manner that the least possible space is thereby occupied and yet produce a perfect working bell, thus reducing the amount of material necessary and heretofore used, and to facilitate the manufacture to a degree heretofore not obtained, and also to arrange that part carrying and supporting the operating parts so that it may be readily and easily removed from its base or wall plate for inspection or repair and again returned without it being necessary to remove the part fastened to the wall, thus avoiding damage to the plaster or defacing the wall in any way, and also to provide certain improved details in construction hereinafter described.

In the accompanying drawings, which illustrate my invention, Figure 1 is a vertical transverse section on line $x\,x$ of Fig. 2. Fig. 2 is a plan view of the same with the cover in section on line $y\,y$ of Fig. 1.

Similar letters of reference refer to similar parts.

Referring to the drawings, A represents the wall plate or base, to which is secured the box or cover B, both preferably made of iron, by screw C passing centrally through it, projections $e\,e\,e\,e$ serving to retain it in a certain position, so that it may be removed and returned to exactly the same position at once. $m$ and $m'$ are the two legs of an electro-magnet, with their coils of insulated wire secured to the sides of cover B by screws $n\,n$, cover B serving as the yoke.

K is its armature, carrying hammer-rod K' and ball $c$ and supported by spring $h$, screw $g$ securing it to the side of cover B. Screw $g$ also supports the binding-post $o$ on the outside of cover B, binding-post $o$ serving as a nut to screw $g$ for placing a strain on spring $h$, screw $g$ thus securing both spring $h$ and post $o$ one to the inside and the other to the outside of cover B. The metal washer $f$ is inserted to prevent any lateral vibration of armature K.

Spring $h$ has a narrowed extension, $h'$, carrying a small piece of platinum soldered to it. One terminal of the coil of insulated wire surrounding electro-magnet $m'$ is secured under the washer $f'$, making connection therewith to the screw $g'$ and insulated from cover B by the insulation represented by letter P.

To prevent the binding-post $o'$ from cutting the insulation when a strain is applied to it sufficient to retain the post in its place, washer $f^2$ is inserted between it and the insulation. I find that if post $o'$ is not screwed up tight and thumb-screw R' is, and it is desired to inspect the operating parts, in attempting to loosen thumb-screw R' post $o'$ will loosen instead, thus causing annoyance and delay. By inserting the metal washer $f'$ beneath the head of screw $g'$ and the metal washer $f^2$ between post $o'$ and insulation P, I can screw up post $o'$, which acts as a nut to screw $g'$ tightly, and with a sufficient strain to prevent its "slacking back," when thumb-screw R' is loosened without fear of the head of screw $g'$ or the body of post $o'$ cutting the insulation.

Post $o'$, screw $g'$, insulation P, washers $f'$ and $f^2$, and one terminal of the coil of magnet $m'$ are supported and insulated from the sides of cover B.

$d$, Fig. 2, is a contact-screw carrying a small piece of platinum wire, $d^2$, riveted into its point. $f^3$ and $f^4$ are metal washers used for the same purpose described in the case of post $o'$. $d'$ is a thumb-nut working on contact-screw $d$, and is for the purpose of locking screw $d$ in any desired position to prevent its slacking back under the vibration of the bell when ringing. $v$ is a bushing threaded centrally for the reception of contact-screw $d$, and having a portion of its outside surface reduced and threaded for the reception of nut $v'$, this reduced portion forming a head or shoulder, so that when screwed up it will not pass entirely through washer $f^3$.

It will be seen that it is necessary to have bushing $v$ screwed up tightly and sufficiently to prevent its turning when it is desired to loosen thumb-nut $d'$. To prevent the shoulder of bushing $v$ and also the nut $v'$ from cutting the insulation $P'$, the washers $f^3$ and $f^4$ are inserted, thus making it possible to screw up $v'$ tightly without incurring that difficulty.

One terminal of the wire coil of the electro-magnet $m$ is secured beneath washer $f^4$ and making connection therewith to nut $v'$, bushing $v$, and contact-screw $d$, and insulated from cover B. The other two terminals of the bobbins are twisted together, as shown at $t$.

$w$ is a piece of soft-rubber tubing to prevent any accidental connection of the terminal of bobbin $m$ in its passage therefrom to washer $f^4$.

$A'$ is a gong.

$B'$ is a hole in the side of cover B large enough to admit of the vibration of hammer-rod $K'$. A projection, $C'$, is cast on the base or wall plate A for the reception of screw C, and is countersunk so as to enable the point of screw C to find its place when it is desired to attach the cover with its parts thereto.

$s\ s$ are rivets of non-magnetic material projecting through armature K to prevent the armature K from touching the poles of the magnet, which is done to prevent what is technically known as "sticking," due to residual magnetism. Plate A carries a projection, $A^2$, cast onto it, to support the gong $A'$, and secured by $A^3$. $u\ u$ are holes for attaching the bell to the wall or other place.

The operation of the construction which I have described is as follows: Either the — or the + wires (it makes no difference how they go) are attached to the binding-posts $o$ and $o'$, respectively, and secured thereto by thumb-screws R and R'. The current in its passage passes, say, from post $o'$ to screw $g'$, thence to washer $f'$ and the terminal of bobbin $m'$ in connection therewith, thence to twisted connection $t$, through bobbin $m$ and its terminal, passing through soft-rubber tube $w$, to washer $f^4$, to nut $v'$, to bushing $v$, contact-screw $d$, and platinum point $d^2$, and platinum point $h^2$ to spring $h$, thence to washer $f$ and screw $g$, cover B, and out through post $o$ to return to the battery.
The current in its passage magnetizes the iron cores of $m$ and $m'$, attracting armature K. Armature K in this movement toward the magnet takes with it hammer-rod $K'$ and ball $c$, spring $h$ removing it from contact with screw $d$. This causes a break or opening of the contact-points and a stoppage of the electric current, there being now no electricity traversing the coils. The cores of $m$ and $m'$ are no longer magnetized and have no attraction for its armature, which, due to the tension of spring $h$, returns immediately to its original position, establishing again the connection at the contact-points, and consequently again energizing the magnet, and this motion it keeps on repeating, ringing the bell by ball $c$ striking the gong at every attraction of armature K until the current stops, all of which operation is well known. The cover B, not having projections of any kind, makes it easy to place in a gig for the purpose of drilling, which also facilitates the handling of the gig.

I am aware of the patents granted to Edwards and Lüngen, April 26, 1881, No. 240,582, and to Edgar W. Hayazer, June 10, 1884, No. 300,253, and Resisue No. 10,533, of October 21, 1884.

I am aware that other means may be employed by which the box or cover B, when removed from its base or wall plate, can be returned to exactly the same position again. I do not, therefore, confine myself to the method described.

Having thus described my invention, what I claim as new, and desire to secure by Letters Patent, is—

1. The combination, substantially as hereinbefore set forth, in an electric bell, of a wall plate or base, A, having a projection to support gong $A'$, and projections $C'$ and $e\ e\ e\ e$, with an inclosing box or cover, B, supporting the operating parts, and screw C, substantially as described.

2. The combination, substantially as hereinbefore set forth, in an electric bell, with a wall plate or base, A, having projections $A^2$, $C'$, and $e\ e\ e\ e$, of an inclosing box or cover, B, bobbins of insulated wire $m\ m$ and their iron cores, screws $n\ n$, armature K, hammer-rod $K'$, ball $c$, spring $h$, non-magnetic pieces $s\ s$, screw $g$, post $o$, screw R, screw $g'$, washers $f^2_a f'\ f^2\ f^3\ f^4$, insulation P, insulation $P'$, post $o'$, screw $R'$, soft-rubber tube $w$, bushing $v$, nut $v'$, thumb-nut $d'$, thumb-screw $d$, platinum points $d^2$ and $h^2$, screw $A^3$, and gong $A'$, substantially as described.

3. The combination, in an electric bell, with an inclosing box or cover, B, of a post, $o$, screws R and $g$, washer $f$, spring $h$, with its narrowed extension $h'$, armature K, non-magnetic pieces $s\ s$, platinum point $h^2$, hammer-rod $K'$, and ball $c$, substantially as described.

4. In an electric bell, an inclosing box or cover, B, supporting the operating parts and perforated for the reception of screw C, substantially as described.

5. The combination, in an electric bell, of spring $h$, with its narrowed extension, platinum point $h^2$, hammer-rod $K'$, ball $c$, armature K, non-magnetic pieces $s\ s$, post $o$, washer $f$, and screws R and $g$, substantially as described.

6. An electric bell consisting of a base or wall plate supporting gong $A'$ and an inclosing box or cover supporting the operating parts, connected together and operating essentially as described, and for the purpose set forth.

EDWARD A. WILDT.

Witnesses:
ALFRED F. WILDT,
HENRY WILLIAMS.